United States Patent Office 3,363,244
Patented Jan. 9, 1968

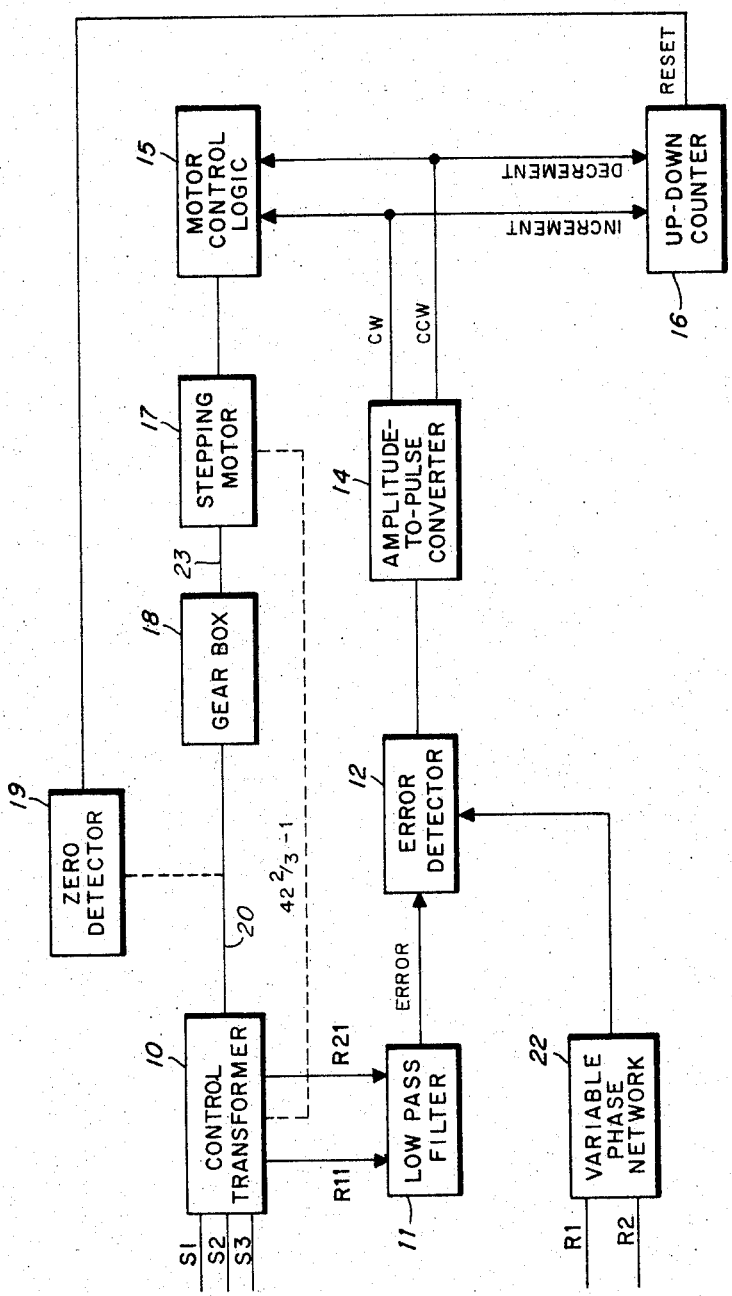

3,363,244
SYNCHRO-TO-DIGITAL CONVERTER
Warren E. Milroy, San Diego, Calif., assignor to the United States of America as represented by the Secretary of the Navy
Filed Oct. 12, 1964, Ser. No. 403,417
3 Claims. (Cl. 340—347)

The invention described herein may be manufactured and used by or for the Government of the United States of America for governmental purposes without the payment of any royalties thereon or therefor.

The present invention relates to a synchro-to-digital converter and more particularly, to a synchro-to-digital converter having a digital output indicative of azimuth position of a remote rotating shaft.

There are various ways of converting a synchro voltage to a usable output in a system which requires that a moving member be accurately encoded as to azimuth position. One might be to let the synchro signals position, through a servomechanism, a sweep resolver which is essentially an analog operation. Another way of accomplishing the end would be to position a shaft encoder through a servomechanism however, the encoder itself is unreliable and relatively expensive complex equipment is required.

An object of the present invention is to provide an improved low cost easy to maintain synchro-to-digital converter.

Another object of the present invention is to provide a servomechanism which allows the position of a remote shaft to be duplicated by a non-remote shaft very accurately at a non-remote location. The non-remote shaft can in turn be used to drive encoding and decoding components.

An additional object of the present invention is to provide a digital servomechanism which reacts faster than an analog servo system.

An additional object of the present invention is to provide a synchro-to-digital converted incorporating a feedback loop which discounts the error before the servo loop compensates for the error.

Other objects and many of the attendant advantages of this invention will be apparent from perusal of the accompanying figure which sets forth a preferred embodiment of the invention.

Basically, the synchro-to-digital converter set forth in the accompanying figure takes the reference and stator signals from a synchro transmitter on an equipment, such as a rotating antenna, applies these signals to a control transformer whose rotor is driven by a stepping motor and gear box, detects the amplitude and phase of the error signal generated at the rotor of the control transformer and develops variable rate pulse trains which activate the motor in a CW or CCW direction such as to bring the error signal to null. The pulses applied to the motor are simultaneously applied to an up-down counter in such a way as to increment the counter with CW pulses and decrement the counter with CCW pulses. The counter is reset to zero each time the control transformer is driven through the zero azimuth position. The counter at all times contains a digital word which represents the azimuth position of the remote shaft.

The accompanying figure illustrates this system wherein the output synchro signals $S_1$, $S_2$ and $S_3$ are coupled into a control transformer 10 having an R winding which is mechanically coupled through a shaft 20 to a gear box 18. The R winding of the control transformer produces an $R_{11}$ and an $R_{21}$ voltage which are coupled through a low-pass filter 11, as an error signal, to the input of an error detector 12.

$R_1$ and $R_2$ signals, which are taken from the R winding of a synchro transmitter mounted on a rotating member such as an antenna, are coupled into the input of a variable phase network 22 and the output of the network is coupled as a reference signal to another input on the error detector 12. The output of the error detector is coupled to an amplitude-to-pulse converter 14 which is set forth in Patent No. 3,136,990 to J. M. Howe which has two outputs; one a CW output (clockwise) and the other a CCW (counterclockwise). The output of the amplitude-to-pulse converter is a pulse output; the rate of the pulse output is commensurate with the amplitude of the input signal, while the sense of the output pulses, i.e. CW or CCW pulses, depends on the phase of the input error signal.

The CW output is coupled as an increment input to an up-down counter 16 while the CCW output is coupled as a decrement input to the same up-down counter 16. The output of the up-down counter is a 10-bit binary word which would represent the azimuthal position of a rotating member, for instance a rotating antenna.

The CW output and CCW output are also coupled in to the input of a motor control logic block 15. The motor control logic is an AND gate matrix for sorting out the signals which are then coupled to a stepping motor 17. The stepping motor drives an output shaft 23 which is coupled to a gear box 18 for providing a 42⅔-to-1 ratio between the stepping motor and the control transformer 10.

A zero detector 19 is coupled to the shaft 20 connecting gear box 18 to the R winding of control transformer 10 and the output of the detector is coupled as a reset input to counter 16 for resetting the counter to an initial number. The zero deector 19 comprises a simple code wheel, which has a cardinal indicator which provides an output upon every 360° of rotation of the R winding in control transformer 10 and therefore indicates one complete scan of an associated rotating member, such as an antenna.

In operation, the low pass filter 11 is not needed unless the harmonic content of the error voltage is high, then the low pass filter shapes the error output of the control transformer 10 to an approximate smooth sine wave.

The variable phase network 22 is needed in that a phase shift ordinarily exists between the error voltage and the reference voltage, introduced by the synchro (about 18°). It is essential that the zero cross-over points of the error and reference sine wave occurs together due to logic circuits used in the error detector.

The error detector 12 detects the phasing and magnitude of the error voltage with respect to the reference voltage and merely comprises an AND gate matrix.

The amplitude-to-pulse converter 14 is described in Patent No. 3,136,990 and, briefly, converts the voltage output or error detector 12 into either clockwise pulses of counterclockwise pulses dependent upon the phase and magnitude.

The CW and CCW pulses which are coupled as increment and decrement pulses to the up-down counter 16 cause the counter to function such that an output is provided which is a digital indication of antenna azimuth position, for instance.

The CW and CCW pulses which are coupled to the motor control logic are utilized to drive the stepping motor 17 in the correct direction and in the correct magnitude to bring the $R_{11}R_{12}$ signal to null. The motor control logic comprises a logic matrix which is commercially available and therefore no further illustration is made of this portion of the system.

The synchro-to-digital converted is especially useful in an application where antenna azimuth position is to be utilized in a system which requires a digital output or where a digital output will be more accurate than a conventional analog output. In the present system the error is counted before it is compensated for by the feedback loop and in addition the system can follow more accurately than a conventional analog servomechanism. A further advantage in using a stepping motor in a servo loop is that the stepping motor reacts much faster than an analog servo.

Obviously many modifications and variations of the present invention are possible in the light of the above teachings. It is therefore to be understood that within the scoop of the appended claims the invention may be practiced otherwise than as specifically described.

What is claimed is:

1. A synchro-to-digital converter comprising;
    input means adapted to receive a synchro signal;
    said signal containing position information from a remote rotating shaft;
    another input means adapted to receive a reference signal from the aforesaid rotating shaft;
    error detection means operatively coupled to said input and said other input for comparing the synchro signal and the reference signal;
    said error detection means operating to determine the phase relationship of the synchro signal to the reference signal and the amplitude of the error between the reference and the synchro signals;
    converter means receiving the output of said error detection means for converting said output to pulses indicating a direction commensurate with said phased relationship and at a pulse rate which is a function of the amplitude of error between said synchro signal and the reference signal;
    control logic means connected to receive said pulses for producing a directional pulse drive signal;
    drive means connected to said input means and responsive to said drive signal for positioning said input means in accordance with the directional sense and pulse rate of said drive signal;
    a bi-directional digital counter means connected to receive the pulse output of said converter and being responsive thereto for producing a digital readout indicative of the rotational position of said input means; and
    a zero detector responsive to a predetermined position of said input means for producing a rest signal operative to reset said bi-directional digital counter upon passing through said pre-determined position.

2. A synchro-to-digital converter as set forth in claim 1 and further comprising;
    control transformer means having a movable winding operatively coupled between said input means and said error detection means;
    said movable winding operating to produce a signal which is introduced to said error detection means for comparison against said reference signal.

3. A synchro-to-digital converter as set forth in claim 2 wherein;
    said drive means includes a stepping motor connected to receive said directional pulse drive signal; and
    said stepping motor has an output shaft which is coupled to said moving winding of said control transformer;
    said stepping motor operating on said moving winding so that the signal produced by the winding is substantially nulled.

References Cited

UNITED STATES PATENTS 3,217,318   11/1965   Masel _____ 340—347

MAYNARD R. WILBUR, *Primary Examiner.*

H. L. BRYAN, W. M. KOPACZ, *Assistant Examiners.*